United States Patent
Mattes et al.

(10) Patent No.: US 6,729,600 B2
(45) Date of Patent: May 4, 2004

(54) VALVE FOR REGULATING FLUIDS

(75) Inventors: Patrick Mattes, Stuttgart (DE); Wolfgang Stoecklein, Stuttgart (DE); Dietmar Schmieder, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 10/216,935

(22) Filed: Aug. 12, 2002

(65) Prior Publication Data

US 2003/0034466 A1 Feb. 20, 2003

(30) Foreign Application Priority Data

Aug. 14, 2001 (DE) .......................... 101 39 857

(51) Int. Cl.[7] .................... F16K 31/02; F16K 31/122
(52) U.S. Cl. .................. 251/63.5; 251/186; 251/324
(58) Field of Search .................... 251/57, 62–63.6, 251/186, 190–191, 324–325

(56) References Cited

U.S. PATENT DOCUMENTS 4,420,011 A * 12/1983 Roger .......................... 251/62
5,673,897 A * 10/1997 Crochet et al. ............ 251/63.6
6,227,223 B1 * 5/2001 Crochet et al. ............ 251/63.6

FOREIGN PATENT DOCUMENTS

DE 199 46 833 A1 5/2001

* cited by examiner

Primary Examiner—Paul J. Hirsch
(74) Attorney, Agent, or Firm—Michael J. Striker

(57) ABSTRACT

A valve for regulating fluids includes a piezo-electric actor unit (9) for operating a valve member assembly. The valve member assembly has at least one first piston (13) guided in a valve body (10) and a second piston (14). A hydraulic chamber, acting as a hydraulic converter, is disposed between the first and second pistons (13, 14). The second piston operates a valve-closing member (15) disposed on an end facing away from the hydraulic chamber (16). The valve closing member (15) cooperates with at least one valve seat (17) formed on the valve body (10) and in a closed position, separates a system pressure region (18) of the valve (1) from a high pressure region (5). The second piston (14) is surrounded by and supported by an approximately casing-type spacer (22) on the valve body (10).

8 Claims, 2 Drawing Sheets

VALVE FOR REGULATING FLUIDS

BACKGROUND OF THE INVENTION

The present invention relates to a valve for regulating fluids with a piezo-electric actor unit for operating a valve member assembly.

DE 199 46 833 A1 discloses a valve for regulating liquids with a piezo-electric actor unit for operating a valve member, which is axially displaceable in a bore of a valve body and on one end, has a valve-closing member, which cooperates with at least one seat on the valve body for opening and closing the valve. In this manner, the valve-closing member divides a low-pressure region from a high-pressure region, which, for example, represents a rail pressure region in a common rail injection valve of a motor vehicle. The valve member is separately formed with first and second pistons, which are separated from one another by means of a hydraulic chamber operating as a hydraulic converter.

With the type of valves in which the stroke or lift of the actor is increased with a hydraulic coupler, the action of the force on the volume of the hydraulic chamber, for example, via the column delimiting the pistons, causes leakage loss, which leads to an inaccuracy on subsequent valve operations, in the event no refilling of the hydraulic chamber takes place.

For the refilling of the hydraulic chamber, it is proposed in DE 199 46 833 A1 to provide a refilling device for removal of the hydraulic fluid of the high-pressure region, which is formed with a channel having a throttle bore. For refilling of the hydraulic chamber, the channel opens into a column surrounding the first and/or second piston and which has a branch to a valve low-pressure chamber via an overpressure valve. The valve low-pressure chamber is bordered by a valve seat that is displaceable by the valve-closing member. This type of valve construction with this type of refilling device, however, is relatively expensive.

Based on reasons of cost and function, in subsequent developments, the entire valve region from the hydraulic chamber to the valve seat of the valve closing member was formed as a system pressure region, whereby the refilling step takes place simultaneously with the opening of the valve closing member.

With this type of solution, which will be described in greater detail below with reference to FIG. 1, the constructive change of the refilling of the second piston is biased through a spring with minimal tensioning, whereby the necessary pressure difference for supplying is formed and the second piston remains in position on the valve closing member.

However, as previously noted, a spring is necessary for biasing the piezo-electric actor unit and a further spring of the valve must be hereby coordinated. This can create problems due to minimal space, since a similar and easily reacting spring requires a correspondingly large length.

In this regard, the realization of an exactly measured, multiple injection difficult, since the spring-loaded second piston can swing through powerfully upon multiple injections under certain circumstances, whereby a correspondingly large quantitative tolerance is provided.

SUMMARY OF THE INVENTION

The valve of the present invention, in which the second piston is supported on the valve body in the direction of the hydraulic chamber via at least an approximately casing-type spacer surrounding the hydraulic chamber, represents an optimization of the hydraulic coupler function of the hydraulic chamber relative to refilling.

If one were to compare the refilling of the hydraulic chamber by using a spacer as opposed to a spring, a quicker refilling of the hydraulic chamber takes place, since the refilling no longer takes place corresponding to the ratio of the spring force on the second piston with reference to the cross sectional surface of the second piston, rather takes place directly with the surrounding system pressure.

Upon many quick, successive operations of the valve, which occur in multiple injections of the valve in an fuel injection valve, as noted above, it is advantageous with the embodiment of the present invention with a spacer for supporting the second piston on the valve body that the spacer represents a type of an overstroke stop and prevents a swinging-through of the second piston. By the use of this type of fixed stop of the second piston against the hydraulic chamber, for example, the quantitative tolerances that occurred with multiple injections can be specifically reduced.

DETAILED DESCRIPTION OF THE PREFERRED EMBODIMENTS

Figure 1:
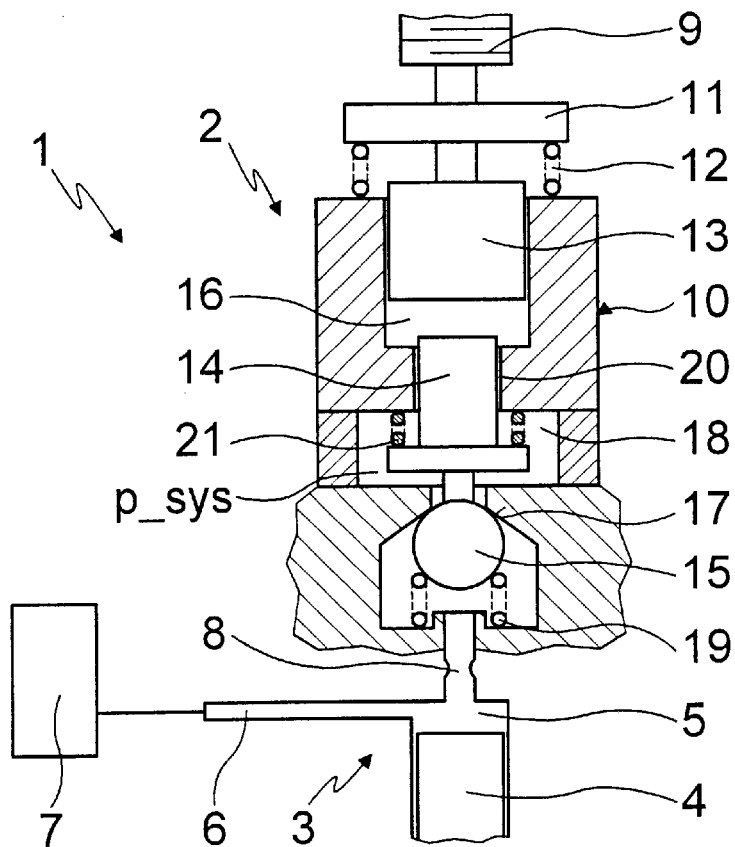
FIG. 1 shows a schematic, cutaway representation of an injection valve with a valve for regulation injections.
Figure 2:
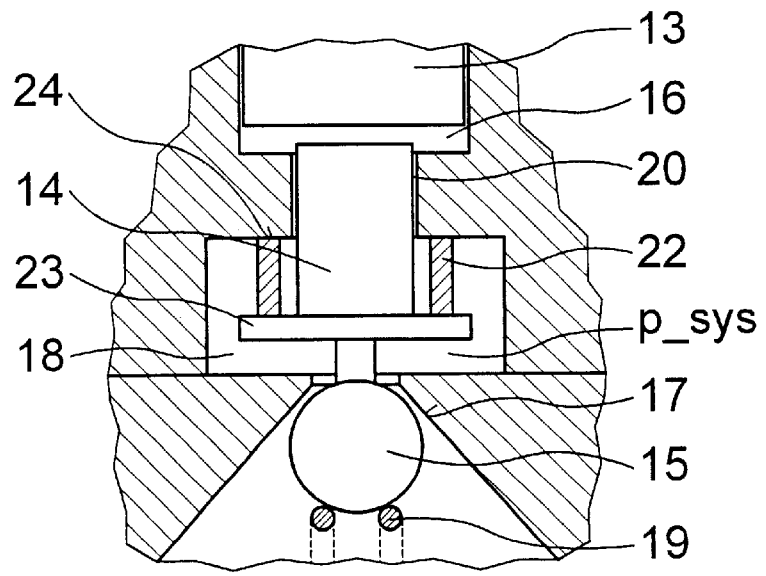
FIG. 2 shows an injection valve with an alternative embodiment of a valve for regulating injection, according to the present invention.

FIGS. 1 and 2 respectively show a fuel injection valve 1, which is provided in a non-represented internal combustion engine of a motor vehicle and here, is formed as a common rail injector for injection of diesel fuel.

The fuel injection valve 1 includes as essential components a module 2, which represents a valve for regulating fuel, and a nozzle module 3.

The nozzle module 3 includes a valve-regulating piston 4 guided in a nozzle body. The nozzle body cooperates with a nozzle needle, which controls an opening of the fuel injection valve 1 leading to the combustion chamber of the internal combustion engine, or the nozzle body forms a single unit with the nozzle needle. A so-called valve control chamber 5 adjoins at the free front side of the valve-regulating piston 4. By means of the pressure level in the valve control chamber 4, the position of the valve control piston 4, or the nozzle needle, is adjusted. The valve control chamber 5 is connected hereto via a high-pressure supply line 6 with a high-pressure storage 7, a so-called common rail that is common for several injection valves. The fuel fed into the high-pressure supply line 6 can thereby stand under a pressure of up to 1.5 kbar.

The valve control chamber 5 further is connected with the valve module 2 via an outlet throttle 8, by which an injection initiation, injection duration, and an injection amount can be adjusted.

The valve 2 includes an actor unit 9, preferably formed as a piezo-electric actor, which is arranged on the side of the injection valve 1 that faces away from the combustion chamber of the internal combustion engine and which serves to operate a valve member assembly. The piezo-electric actor 9 is constructed in the common way from many layers and supports itself with an actor foot (not shown) on a wall of a valve body 10 on one side and on the other side, on its side facing toward the valve member assembly, is biased via an actor head 11 by means of a spring 12 opposite the valve body 10.

The valve member assembly has a first piston 13 guided in the valve body 10, and the first piston 13 can also be designated as a regulator piston or first conversion piston, and a second piston 14, which also can be designated as an operating piston or second conversion piston, whereby the second piston 14 serves for operating a valve closing member 15.

The first piston 13 has a greater diameter than that of the second piston 14. Between the pistons 13 and 14, a hydraulic chamber 16 is arranged, which is embodied preferably as a hydraulic converter, so that an axial deflection of the first piston 13 is transmitted as a result of a voltage load of the piezo-electric actor 10 over the hydraulic chamber 16 on the second piston 14, which makes an increased stroke relative to the transmission ratio of the piston diameter.

The valve-closing member 15 acts together with a valve seat 17 formed on the valve body 10. The valve seat 17 is shown as a spherical seat for a ball-shaped valve-closing member 15. Of course, it is also contemplated that the valve closing member 15 could have another geometric shape and cooperate with two valve seats, meaning that the valve regulating module 2 is formed as a double-seat valve.

The valve-closing member 15 rests on the valve seat 17 with an inoperative piezo-electric actor 9 and separates the high-pressure region from a valve chamber 18 that is limited on the valve seat 17. The valve chamber 18 at least partially surrounds the second piston.

In order to retain the valve-closing member 15 also in a resting stand of the injection valve 1 on the valve seat 17, a spring 19 is provided, which presses the valve-closing member 15 against the valve seat 17.

The valve chamber 18, connected at the low-pressure side to the valve seat 17, contains a pressure storage volume with a system pressure p_sys, which amounts to approximately 20 bar to 30 bar. However, in other embodiments, also values between 2 bar and 50 bars can be adopted. By means of a pressure-holding valve (not further illustrated here), the system pressure can be adjusted so that it is sufficient to guarantee a refilling of the hydraulic chamber 16 after an operation via the ring column 20 surrounding the second piston 14. Upon overstepping a predetermined threshold for the system pressure p_sys, this pressure-holding valve opens and operates so that a corresponding control volume is fed out of the valve chamber 18 and the system pressure chamber.

In order to enable compensation of a leakage loss of the hydraulic chamber 16 as a result of control of the piezo-electric actor with a refilling, the second piston 14 is biased in the embodiment of FIG. 1 via a spring 21 surrounding it in the direction of the hydraulic chamber 16, whereby a "tightening-up" of the second piston 14 upon a pressure loss in the hydraulic chamber 16 is counteracted. The spring force of the spring 21 thereby is dimensionally smaller than the spring force of the spring 19 that retains the valve-closing member 15, so that a certain closing of the valve seat 17 is possible.

With the fuel injection valve 1 shown in FIG. 2, which essentially is similar in construction to the valve of FIG. 1 and which uses the same reference numerals for similarly functioning components, instead of the spring 21 for biasing of the second piston 14, a spacer in the form of a casing 22 surrounding the second piston is provided, which braces the second piston 14 in the direction of the hydraulic chamber 16.

The casing 22 is formed between an offset section 23 of the second piston 14 and a contact surface 24 of the valve body 10 and has a closed shell or outer surface, however, it can also have other forms that depart from this embodiment.

With the embodiment according to FIG. 2, the casing 22 with reference to its length is elastically formed. The length of the casing 22 is dimensioned so that the valve closing member 15 in a resting state is lifted up minimally by the second piston 15 from its valve seat 17, while the casing 22 in its operating condition is shortened to such an extent by pressure from sides of the valve closing member 15 until the valve closing member 15 comes into contact with the valve 17. The distance of the valve-closing member 15 to the valve seat 17, for example, can be 7 μm. This is sufficient to guarantee not only a first filling but also subsequent refillings with each system start.

During operation, when the casing 22 is pressed together to the point that the valve seat 17 is closed, the casing 22 represents an overstroke stop for the second piston 14. By means of the casing 22, a very quick refilling of the hydraulic chamber 16 with the system pressure of the valve chamber 18 via the ring column 20 can take place.

In an embodiment department from that shown in FIG. 2, the spacer, that is, the casing, for supporting the second piston 14 with reference to its length can be designed so that the valve closing member 15 in an assembled state is lifted minimally from the valve seat 17, for example, with a ring column of 5 μm to 7 μm, first by means of the second piston 14, whereby the casing is deformed by action of force from sides of the valve closing member 15, until the valve closing member 15 comes into contact with the valve seat 17. This represents a process-safe assembly procedure, which, however, in contrast to the previously described spring-type embodiment, no longer offers the advantage of a refilling upon each system start.

Independent of whether the casing 22 with reference to its length is elastically formed or has a fixed length by plastic forming, the casing 22 prevents a swinging-through of the second piston 14, which affects the accuracy of multiple injectors particularly advantageously, which in one form of the inventive valve 1 also can lie nearer one another.

Figure 3:
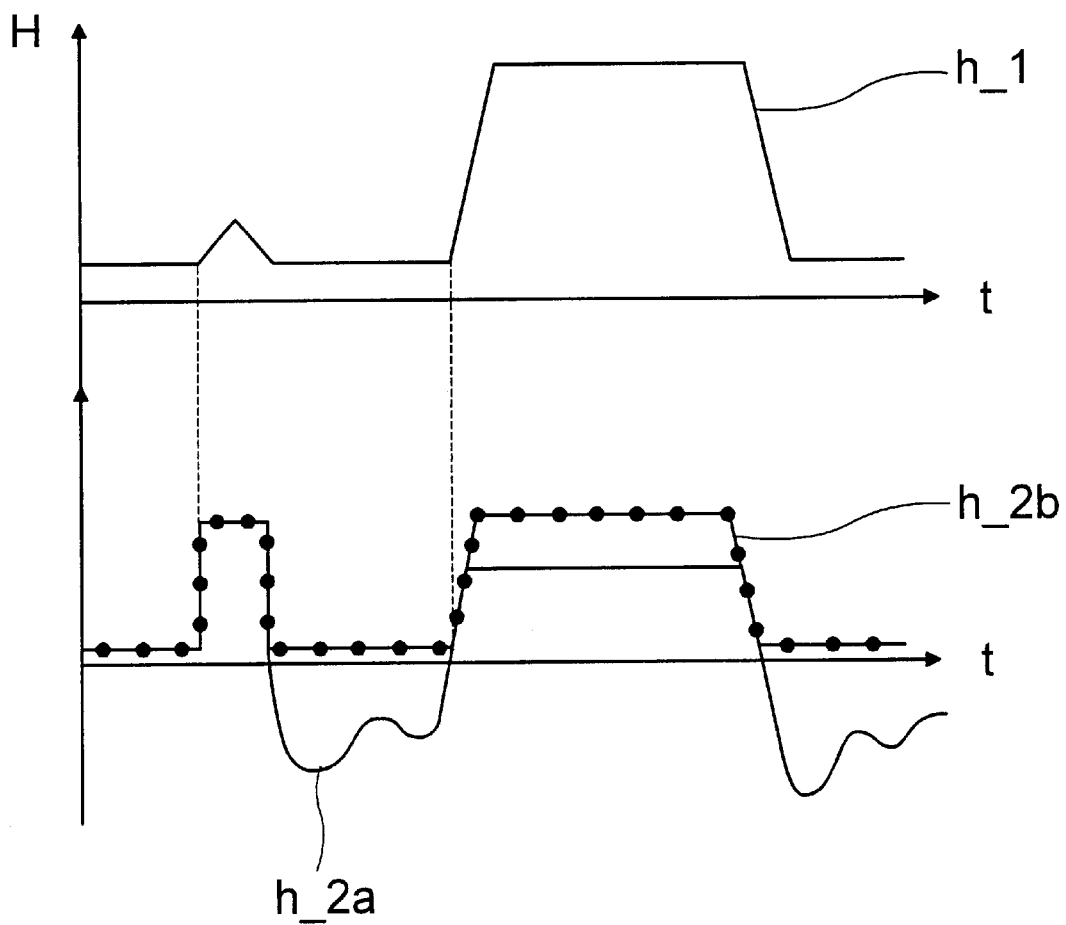
FIG. 3 is a diagram with a comparative representation of stroke patterns.

The differences upon the use of the spring 21 for biasing the second piston 14 and the casing 22 with reference to the stroke of the second piston 14 can be seen in FIG. 3.

In FIG. 3, the stroke or lift H of the valve-regulating piston 4, or the needle of the injection valve 1, over the time t is represented with a line h_1. The stroke or lift running parallel thereto of the second piston 14, which is biased with the spring 21, is designated with the line h_2a, while the stroke or lift of the casing 22 supporting the second piston 14 is designated with the line h_2b. The outermost simplified and clearly qualitative reproduced stroke process shows that with the use of the spring 21, a swinging-through of the second piston 14 on the "minus side" takes place. Depending on the proper frequency of the system, the possibility is limited of performing multiple injections. The range spacer, or casing 22, shows in contrast a clearly defined stopping.

It will be understood that each of the elements described above, or two or more together, may also find a useful application in other types of constructions differing from the types described above.

While the invention has been illustrated and described herein as a valve for regulating fluids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Valve for regulating fluids, comprising:
    a piezo-electric actor unit (9) for operating a valve member assembly, said valve member assembly having a first piston (13) guided in a valve body (10) and a second piston (14), wherein a hydraulic chamber (16) acting as a hydraulic converter is disposed between said first and second pistons (13, 14), wherein the second piston operates a valve closing member (15) on an end of said second piston (14) facing away from the hydraulic chamber (16), wherein said valve closing member (15) cooperates with at least one valve seat (17) formed on the valve body (10) and in a closed position, said valve closing member (15) separates a system pressure region (18) from a high pressure region (5), wherein the second piston (14) in a direction of the hydraulic chamber (16) is surrounded by and supported by means of casing-type spacer (22) on the valve body (10).

2. Valve as defined in claim 1, wherein the spacer (22) is disposed in a valve chamber (18) with a system pressure (p_sys), wherein said valve chamber (18) borders said at least one valve seat (17), said at least one valve seat (17) being displaceable by means of the valve closing member (15).

3. Valve as defined in claim 1, wherein the spacer (22) is arranged between an offset section (23) of the second piston (14) and a contact surface (24) of the valve body (10).

4. Valve as defined in claim 1, wherein the spacer (22) with reference to its length is elastically formed, wherein said spacer (22) has a length with which the valve closing member (15) in a resting state is minimally lifted from one of said at least one valve seat (17) associated with said valve closing member (15) by the second piston (14), and wherein said spacer (22) is elastically shortened in an operating state by pressure from sides of the valve closing member (15) until the valve closing member (15) contacts the associated at least one valve seat (17).

5. Valve as defined in claim 4, wherein the valve closing member (15) is lifted in its resting state up to 7 μm from the associated at least one valve seat (17).

6. Valve as defined in claim 1, wherein the spacer (22) has a length such that the valve closing member (15) in an assembled state is minimally lifted from an associated one of said at least one valve seat (17) by said second piston (14), wherein the spacer (22) is deformed by action of force from sides of the valve closing member (15) until the valve closing member (15) contacts the associated valve seat (17).

7. Valve as defined in claim 6, wherein the valve-closing member (15) in an assembled state is lifted up to 7 μm from the associated valve seat (17).

8. Valve as defined in claim 1, wherein said valve is a component of a fuel injection valve for an internal combustion engine, in particular, a common rail injector (1).

* * * * *